(12) United States Patent
Abe et al.

(10) Patent No.: US 7,767,900 B2
(45) Date of Patent: Aug. 3, 2010

(54) MOBILE COMMUNICATION TERMINAL WITH LIGHT EFFECTS EDITOR

(75) Inventors: Lutz Abe, Erbach (DE); Jurgen Auer, Langenau (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/586,568

(22) PCT Filed: Feb. 19, 2004

(86) PCT No.: PCT/EP2004/001597

§ 371 (c)(1),
(2), (4) Date: Apr. 25, 2007

(87) PCT Pub. No.: WO2005/081224

PCT Pub. Date: Sep. 1, 2005

(65) Prior Publication Data

US 2007/0199432 A1    Aug. 30, 2007

(51) Int. Cl.
*G10H 7/00* (2006.01)
(52) U.S. Cl. ............... 84/645; 84/464 A; 84/464 R
(58) Field of Classification Search ............ 84/464 R, 84/464 A, 600–602, 645
See application file for complete search history.

(56) References Cited

U.S. PATENT DOCUMENTS

| | | | | |
|---|---|---|---|---|
| 3,240,099 A | * | 3/1966 | Irons | 84/464 R |
| 3,869,699 A | * | 3/1975 | Haller et al. | 367/197 |
| 4,185,276 A | * | 1/1980 | Benson | 340/815.46 |
| 4,945,806 A | * | 8/1990 | Merrill, Jr. | 84/645 |
| 5,070,399 A | * | 12/1991 | Martel | 381/56 |
| 5,083,064 A | * | 1/1992 | Jones, Sr. | 315/294 |
| 5,191,319 A | * | 3/1993 | Kiltz | 345/73 |
| 5,402,702 A | * | 4/1995 | Hata | 84/464 R |
| 5,461,188 A | * | 10/1995 | Drago et al. | 84/600 |
| 5,769,527 A | * | 6/1998 | Taylor et al. | 362/85 |
| 6,827,464 B2 | * | 12/2004 | Koren et al. | 362/96 |
| 7,071,403 B2 | * | 7/2006 | Chang | 84/645 |
| 7,183,481 B2 | * | 2/2007 | Hales | 84/645 |
| 7,228,190 B2 | * | 6/2007 | Dowling et al. | 700/94 |
| 7,344,276 B2 | * | 3/2008 | Chornenky | 362/252 |
| 7,394,010 B2 | * | 7/2008 | Nishibori et al. | 84/464 A |

(Continued)

FOREIGN PATENT DOCUMENTS

CN    1739127 A    12/2003

(Continued)

OTHER PUBLICATIONS

Chinese Office Action issued Dec. 11, 2009.

*Primary Examiner*—David S. Warren

(57) ABSTRACT

The activation of lights of a mobile communication terminal is controlled with information in music data files, such as SP-MIDI files. The music data files contain note events informating the terminal to play a note of a particular instrument. Light configuration messages are added to the SP-MIDI file. The light configuration messages contain information mapping the activation position, -color and -intensity to the note events. The mobile terminal is provided with an editor application for creating and changing light configuration messages. The light configuration messages can also be created and changed with a light configuration program on a PC. The light configuration messages can be tested on a PC with a MIDI editor program provided with a plug in application for emulating the mobile communication terminal.

51 Claims, 16 Drawing Sheets

U.S. PATENT DOCUMENTS

| | | | |
|---|---|---|---|
| 7,394,012 B2 * | 7/2008 | Schultz | 84/615 |
| 2002/0154787 A1 * | 10/2002 | Rice et al. | 381/124 |
| 2004/0123727 A1 * | 7/2004 | Hales | 84/645 |
| 2004/0139842 A1 * | 7/2004 | Brenner et al. | 84/477 R |
| 2005/0204899 A1 * | 9/2005 | Cheng et al. | 84/464 A |
| 2005/0219842 A1 * | 10/2005 | Chornenky | 362/252 |
| 2005/0272475 A1 * | 12/2005 | Hahn | 455/566 |
| 2005/0288159 A1 * | 12/2005 | Tackett | 482/84 |
| 2006/0027080 A1 * | 2/2006 | Schultz | 84/613 |
| 2006/0027081 A1 * | 2/2006 | Chang et al. | 84/645 |
| 2006/0236845 A1 * | 10/2006 | Kilkis | 84/600 |
| 2006/0291212 A1 * | 12/2006 | Forsman et al. | 362/276 |
| 2007/0199432 A1 * | 8/2007 | Abe et al. | 84/645 |
| 2008/0041217 A1 * | 2/2008 | Knudsen | 84/464 R |

FOREIGN PATENT DOCUMENTS

| | | |
|---|---|---|
| FR | 2 741 229 | 5/1997 |
| FR | 2741229 A1 | 5/1997 |
| JP | 2001-157254 | 6/2001 |
| WO | WO 02/077585 A1 | 10/2002 |
| WO | 0377505 A2 | 9/2003 |
| WO | WO 03/077505 A | 9/2003 |

* cited by examiner

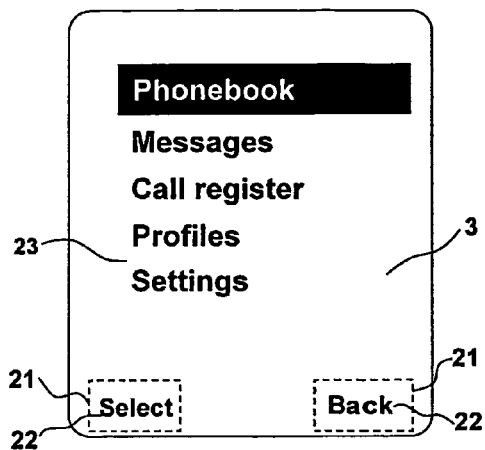
Fig. 6.1
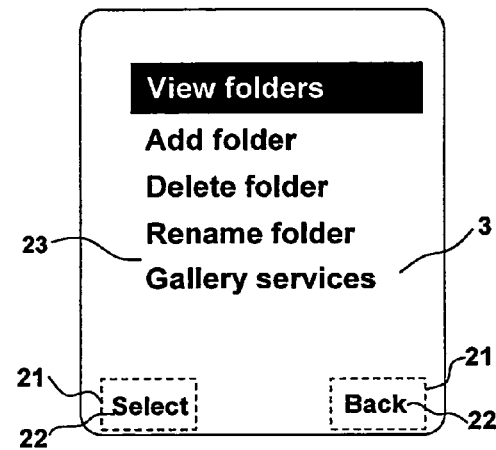
Fig. 6.2
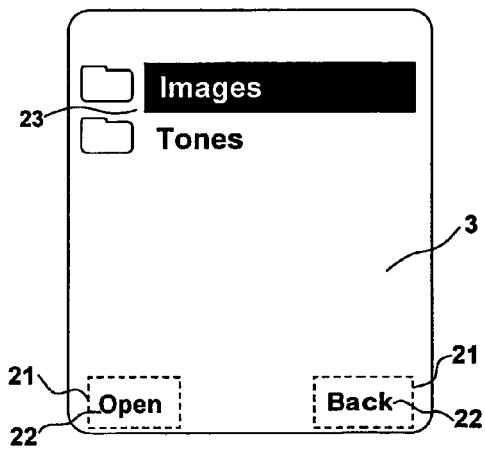
Fig. 6.3
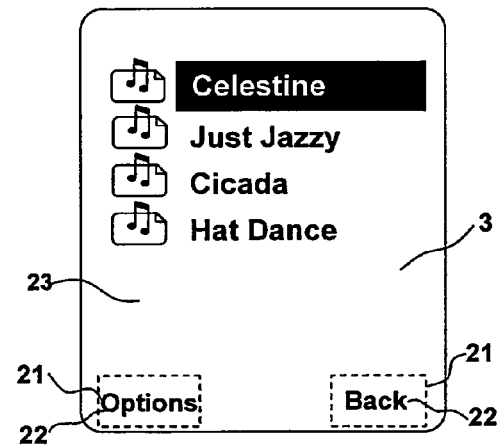
Fig. 6.4

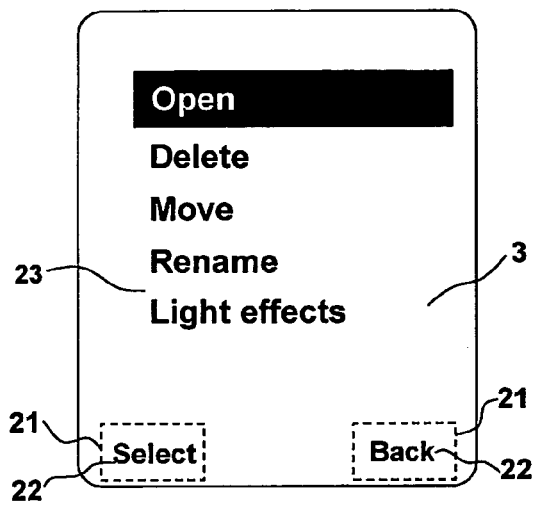
Fig. 6.5
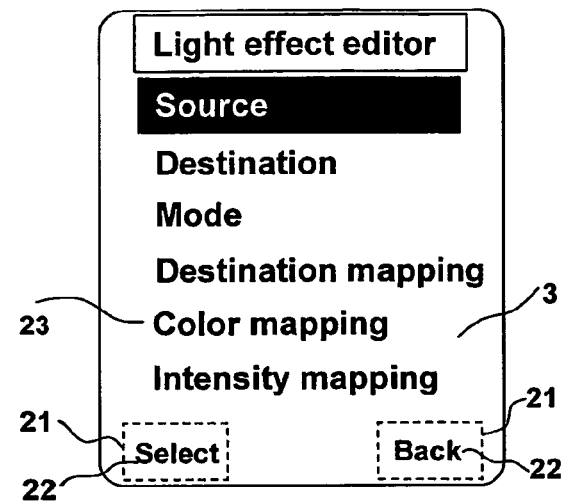
Fig. 7.1
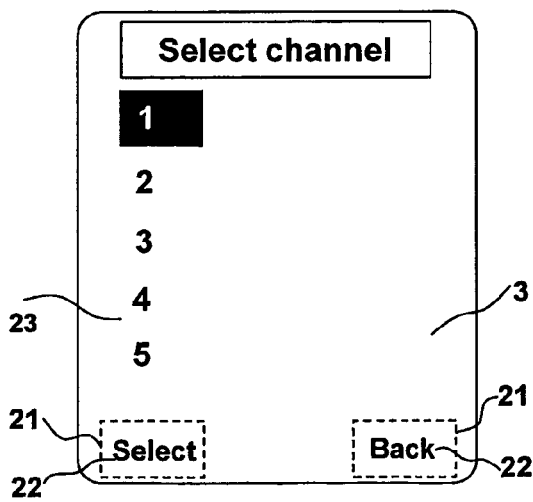
Fig. 7.2
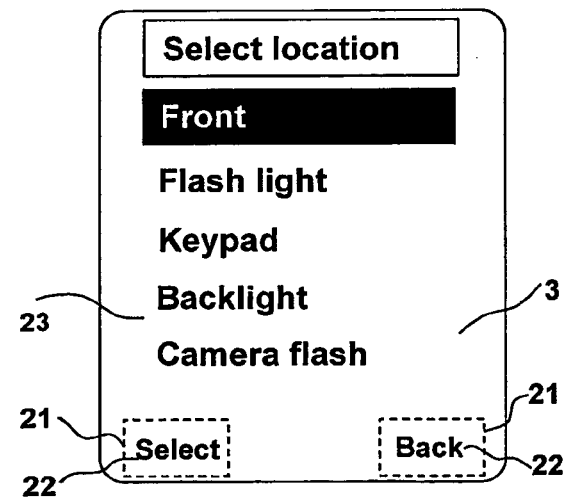
Fig. 7.3

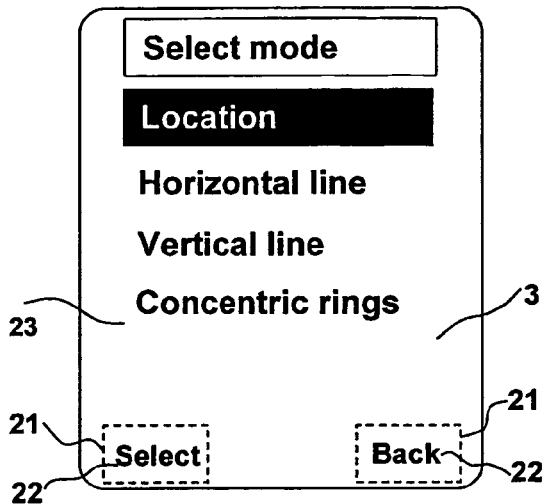
Fig. 7.4
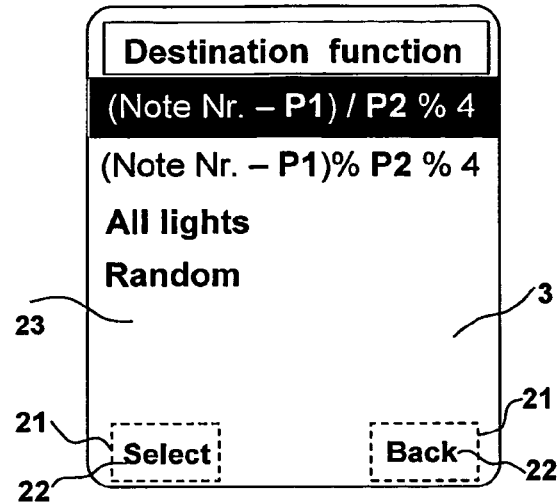
Fig. 7.5
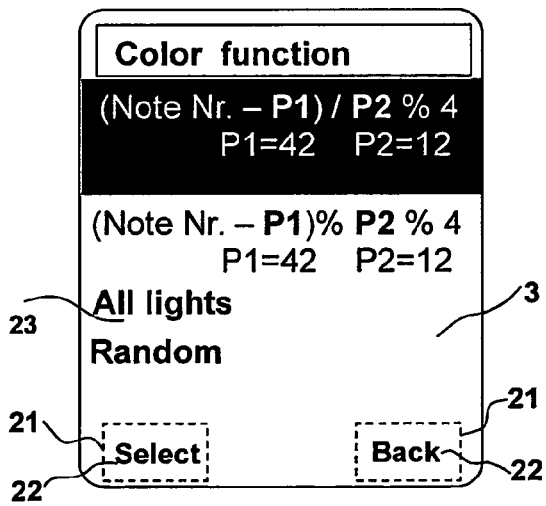
Fig. 7.6
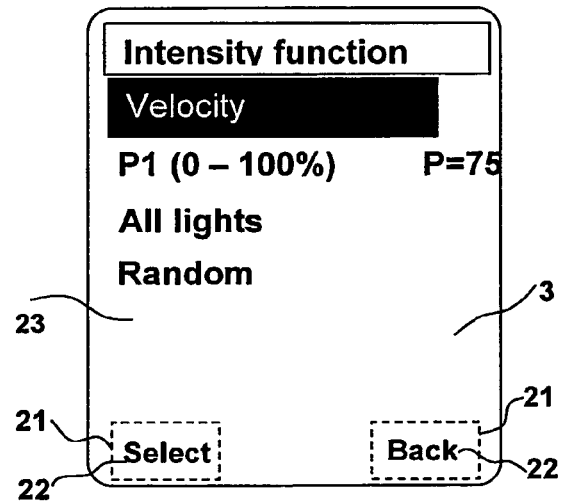
Fig. 7.7

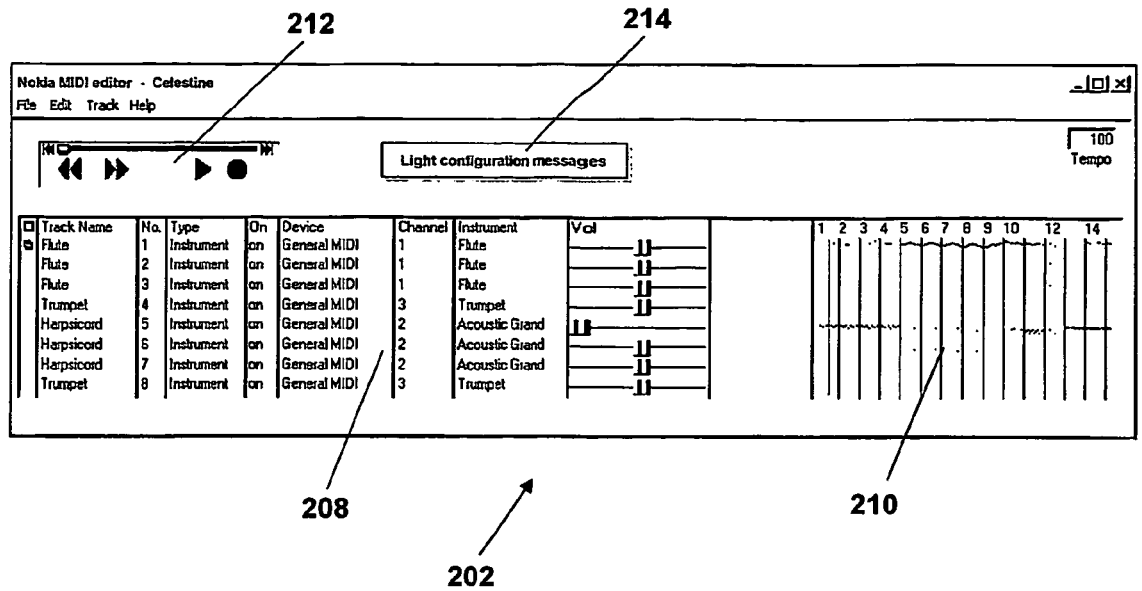
Fig. 8
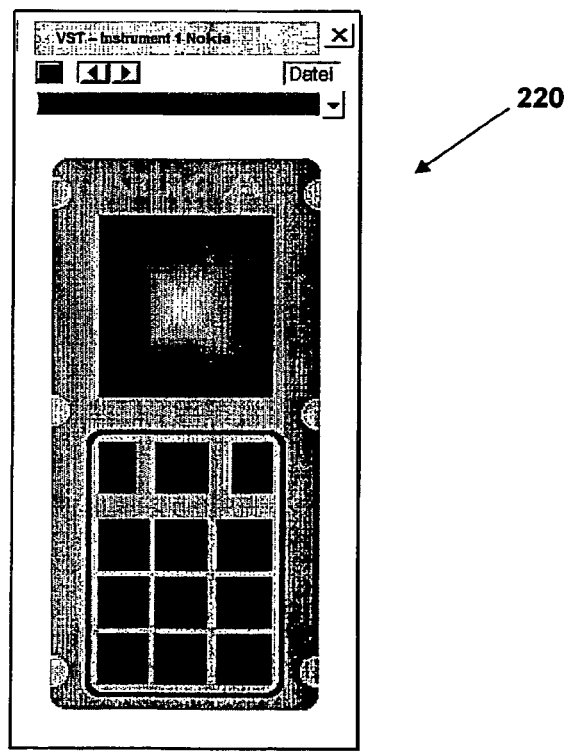

MOBILE COMMUNICATION TERMINAL WITH LIGHT EFFECTS EDITOR

This application is the National Stage of International Application No. PCT/EP2004/001597, International Filing Date, Feb. 19, 2004, which designated the United States of America, and which international application was published under PCT Article 21(2) as WO Publication No. WO 2005/081224 A1.

The present invention relates to a mobile communication terminal capable of playing music from music data and provided with a plurality of lights. In particular, the present invention relates to the control of the activation of the lights, using the information in said music data.

BACKGROUND ART

WO 03/077505 discloses a mobile communication terminal comprising a plurality of lights and means for controlling the activation of the lights. An audio signal, e.g. from a ringing tone, is fed to a signal processor that filters the signal and controls the activation of the lights to let the phone act as a light organ.

The Musical Instrument Digital Interface (MIDI) is an internationally accepted standard for music data for communication between digital music devices. MIDI enables polyphonic musical compositions with a wide variety of different sounds. This means that multiple tones can be played at the same time using predefined instrument sounds such as piano, guitar, violin, drums, etc. The information transmitted between MIDI devices is in the form of MIDI messages, which encode different aspects of sound such as pitch and volume as 8-bit bytes of digital information. MIDI devices can be used for creating, recording and playing back music that is stored as a MIDI file (multiple MIDI messages). Using the MIDI standard, sound cards in computers, synthesizers, and sequencers can communicate with each other, either keeping time or actually controlling the music created by other connected equipment. The message types in a MIDI sequence can be divided in channel messages and system messages. Channel messages apply to a specific channel, and the channel number is included in the status byte for these messages. System messages are not channel specific, and no channel number is indicated in their status bytes.

Channel messages may be further classified as being either channel voice messages, or mode messages. Channel voice messages carry musical performance data, and these messages comprise most of the traffic in a typical MIDI data stream. Channel mode messages affect the way a receiving instrument will respond to the Channel Voice messages.

Channel Voice Messages are used to send musical performance information. The messages in this category are the NOTE ON, NOTE OFF, Polyphonic Key Pressure, Channel Pressure, Pitch Bend Change, Program Change, and the Control Change messages.

With the advent of mobile communication terminals provided with synthesizers capable of playing polyphonic ringing tones from e.g. SP-MIDI files the acoustic quality of the terminals has increased rapidly. Scalable polyphony MIDI (SP-MIDI) is a recent enhancement to the MIDI format that makes it particularly suitable for mobile terminals. SP-MIDI functionality is implemented using a new MIDI message called the Maximum Instantaneous Polyphony (MIP) message. The MIP message is used to define the musical arrangement of the SP-MIDI content according to the desired polyphony levels.

EP 1 255 418 discloses a mobile communication terminal capable of playing ringing tones from MIDI files. The mobile terminal is also provided with a plurality of lights that can be activated by the processor. The document proposes to control the activation of the lights in a MIDI file. Hereto, the lights are implemented as an instrument, with each light seen as a different note. This would however require a modification of the MIDI standard, in particular of the SP-MIDI standard, since none of the instruments (also referred to as timbres or patches) presently defined in these standards are lights. The modification of such a standard is a complicated procedure that involves many parties with different interests, and can—if it succeeds at all—take a very long time. Further, different terminal models are likely to have varying light arrangements, an aspect that would be difficult to deal with when the lights are defined as an instrument in the standard, since this would require the terminals to be provided with lights in a more uniform manner.

DISCLOSURE OF THE INVENTION

On this background, it is an object of the present invention to provide a mobile communication terminal capable of controlling the activation of the lights from information in a music data file in a versatile manner.

This object is achieved by a mobile communication terminal comprising a processor unit being configured to control said communication terminal, an electronic memory having music data stored thereon, said music data including at least a first and a second message type, the first type messages containing information for notes to be played, the second type messages containing other music related information for the mobile communication terminal, a loudspeaker connected to a sound generator configured for generating audio waveforms in accordance with the information in the first type messages, a plurality of lights that can be activated by the processor, and the processor unit being configured by the information in second type messages to activate the lights based on the information contained in the first type messages.

Using the second type messages for mapping the activation of the lights to the first type messages allows the lights to be activated in a versatile way, without need to define the lights as new instruments in the music data standard. By specifying music files for a particular type of terminal, differences in light arrangements between terminal models can be handled by music files being provided with second type messages with different mapping information.

The mapping information may relate to the location, color and intensity of the lights. Recognizable patterns may be mapped to the playing of a note.

The mapping is preferably directly towards note-on and note-off commands contained in the first type messages. The intensity or intensity profile is preferably mapped to velocity information in the first type messages.

Preferably, the first type messages assigned to one specific channel are used for the activating the lights. The instrument assigned to the notes, e.g. the grand piano, in the messages of this channel could be an active part in the played music, or the volume of this channel could be set to zero, so that the lights can be controlled without any influence on the music itself.

The mapping is preferably performed by a function whose arguments comprise the note number. A first parameter may be added or subtracted from the note number and the result can be integer and/or modulo divided by a second parameter in the function. The second parameter may depend on the terminal model, the number of light positions, and/or the number of colors for the lights.

The function preferably reduces the number of available notes to the number of available light locations and the number of available light colors respectively.

The mapping may comprise a random function.

It is also possible to use a look up table for the mapping.

The terminal may comprise a vibrator, a flashlight and/or a camera flash and the processor could be configured by second type messages to activate the vibrator flashlight and/or camera flash based on the information contained in the first type messages.

The mobile communication terminal may further comprise an editor application enabling a user to create and/or edit the second type messages. The editor application may enable the user to select the channel to be used, to select the patterns to be activated, and/or to modify the function.

The terminal may comprise different ranges of lights, e.g. front and back, and the editor application may enable the user to select the range. The editor application may enable the user to map the intensity to the velocity, to a given fixed parameter, or to a random function.

The music data can be a MIDI sequence or file, preferably in the SP-MIDI format. In this case, the second type messages are preferably System Exclusive Messages, whereas the first type messages are preferably note events.

It is another object of the invention to provide a versatile method for controlling the activation of lights of a mobile communication terminal from information in a music data.

This object is achieved by a method for controlling the activation of lights of a mobile communication terminal configured to play music from music data including at least a first and a second message type, the first message type containing information for notes to be played, the second message type containing other information for the device that is to reproduce the music, comprising the step of placing in the second type messages data mapping the activation of the lights to the note information contained in the first type messages.

This method does not require the lights to be defined as an instrument, and thus avoids the need to change present standards in music data. Further, the activation of the lights is note controlled and therefore much more precise than the control in a light organ which is based on filtering the audio signal.

The data mapping the position of lights to be activated can be placed in the second type messages. The data mapping the color of lights to be activated can also be placed in the second type messages. The data mapping the intensity of lights to be activated can also be placed in the second type messages.

A function whose arguments include the note number can be placed in the second type messages. The function preferably adds or subtracts a first parameter from the note number and integer and/or modulo divides the result by a second parameter. The function preferably reduces the number of available notes to the number of available light locations and to the number of available light colors respectively. A random function can be applied within the overall function.

The music data can be a MIDI sequence or file, preferably in the SP-MIDI format. If the music data is in the MIDI format, the second type messages can be System Exclusive Messages, whereas the first type messages are preferably note events.

One or more second type messages can be placed in the beginning of the music data file or sequence for initializing the mapping. Further, second type messages can be placed later on in the music data file or sequence for changing the mapping, the second type messages preferably being all located within one track.

It is a further object of the invention to provide a computer terminal configured for creating and/or modifying music data files containing information for controlling the activation of lights of a mobile communication terminal.

This object is achieved by a computer terminal comprising a processor unit controlling the terminal, a user interface comprising a keyboard and a display, an electronic memory having music data stored thereon, said music data including at least a first and a second message type, the first type messages containing information for notes to be played, the second type messages containing information for mapping the activation of lights on a mobile communication terminal to the note information in the first type messages, a loudspeaker connected via an amplifier to a sound generator capable of generating audio waveforms in accordance with the music data, and an application for creating and/or modifying the second type messages.

Thus, music data files containing second type messages including mapping information for the activation of the lights of a mobile communication terminal can be created and or modified on a computer terminal like a PC, and subsequently downloaded to a mobile communication terminal.

The application can be configured to emulate the activation of the lights of a mobile terminal on the display of the computer terminal. This allows the music data file to be tested for both sound and light effects on the terminal without need to download the file to the terminal after each modification for testing.

The application can also be configured for controlling lights of a mobile communication terminal connected thereto for allowing of testing the activation of the lights directly on the mobile communication terminal.

It is a further object of the invention to provide a music data sequence or file for use on a mobile communication terminal that allows for a more versatile control of activation of the lights of the terminal.

This object is achieved by a music data sequence or file for use on a mobile communication terminal, said music data file containing at least first type messages with note information, and second type messages mapping the activation of lights of a mobile communication terminal to the note information contained in the first type messages.

The first type massages preferably contain note-on and note-off commands, and the second type messages preferably contain information mapping the activation of lights to the note-on commands, and information mapping the deactivation of lights to note-off commands.

The first type messages preferably contain velocity information associated with a note-on command, and the second type messages preferably contain information mapping the intensity of a light to be activated to the velocity information.

The first type messages contain preferably the note number associated with a note-on or note-off command, and the second type messages preferably contain a function whose arguments comprise the note number. The function preferably reduces the range of note numbers to the range of light locations on the mobile communication terminal. The function preferably reduces the range of note numbers to the range of light colors on the mobile communication terminal.

The music data file or sequence is preferably in a MIDI format, preferably the SP-MIDI format and the second type messages are preferably system exclusive messages.

Further objects, features, advantages and properties of the mobile communication terminal, the method for controlling the activation of lights of a mobile communication terminal, the computer terminal and music data file or sequence format according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which FIG. 8 is a screen shot of a computer terminal with a MIDI editor program.

DETAILED DESCRIPTION

In the following detailed description, a mobile communication terminal according to the invention in the form of a hand portable phone, preferably a cellular/mobile phone, will be described by the preferred embodiments.

Figure 1:
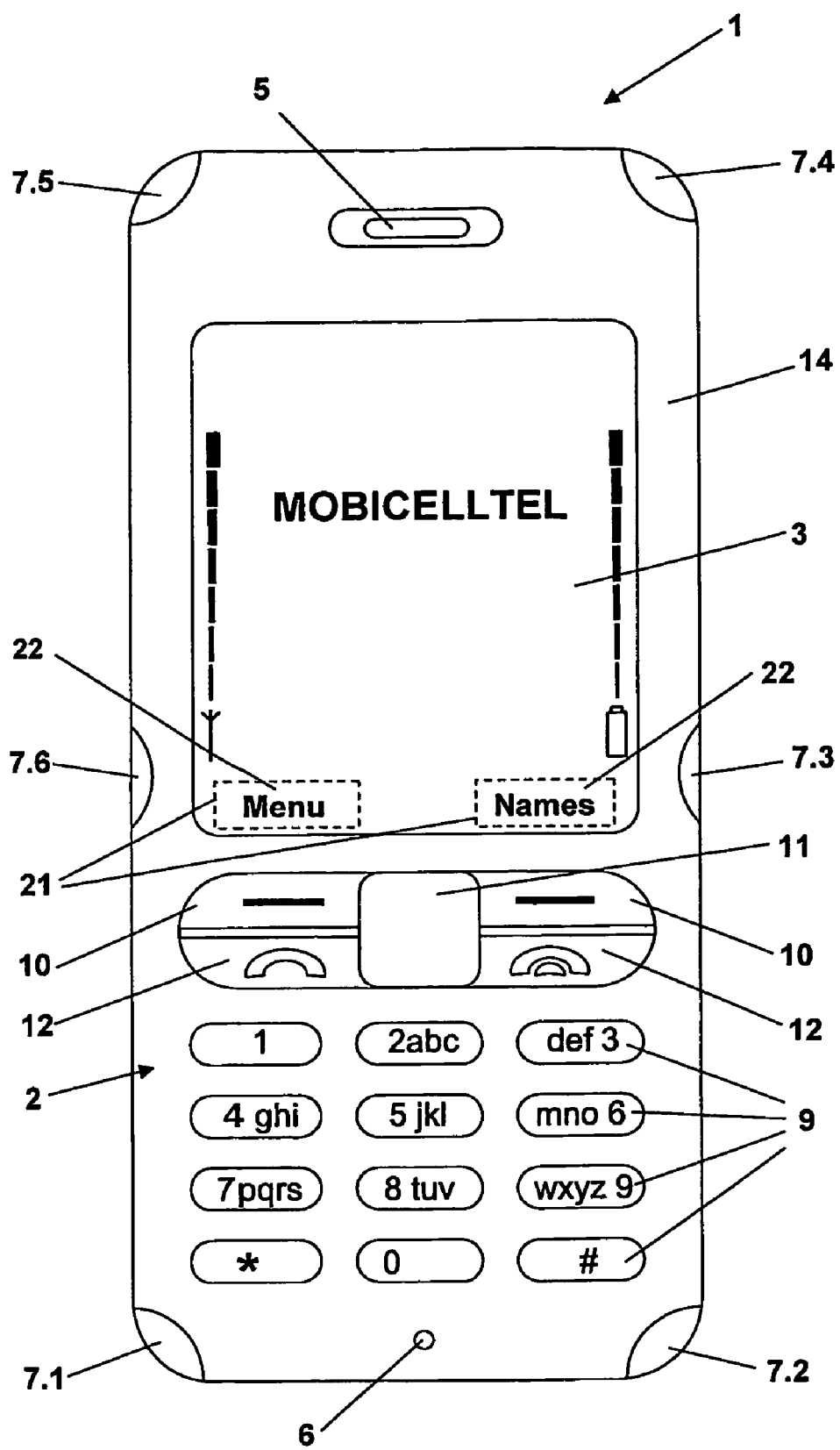
FIG. 1 is a frontal view of a mobile communication terminal according to the invention

FIG. 1 shows a preferred embodiment of a mobile phone 1 according to the invention. The mobile phone 1, comprises a user interface having a keypad 2, a display 3, an on/off button (present in the top of the phone) a speaker 5, and a microphone 6 (only the opening present in the lower part of the phone is visible). The mobile phone 1 according to the preferred embodiment is adapted for communication via a cellular network, such as the GSM 900/1800 MHz network, but could just as well be adapted for use with a Code Division Multiple Access (CDMA) network or the G3 network.

According to a preferred embodiment, the keypad 2 has a first group of alphanumeric keys 9, two softkeys 10, a cursor navigation key 11 (scroll up/down), and on-hook and off-hook keys 12. The present functionality 22 of the softkeys 10 is shown in separate fields 21 (softkey-labels) in the display 3 just above the softkeys. The softkeys 10 are multifunction keys and their present function depends on the state of the mobile phone 1. The softkeys 10 give access to the menu, the phonebook and call can activate actions related to call handling and message handling. A releasable battery pack (not shown) is received in a cavity under the releasable rear cover of the mobile phone 1.

Figure 2:
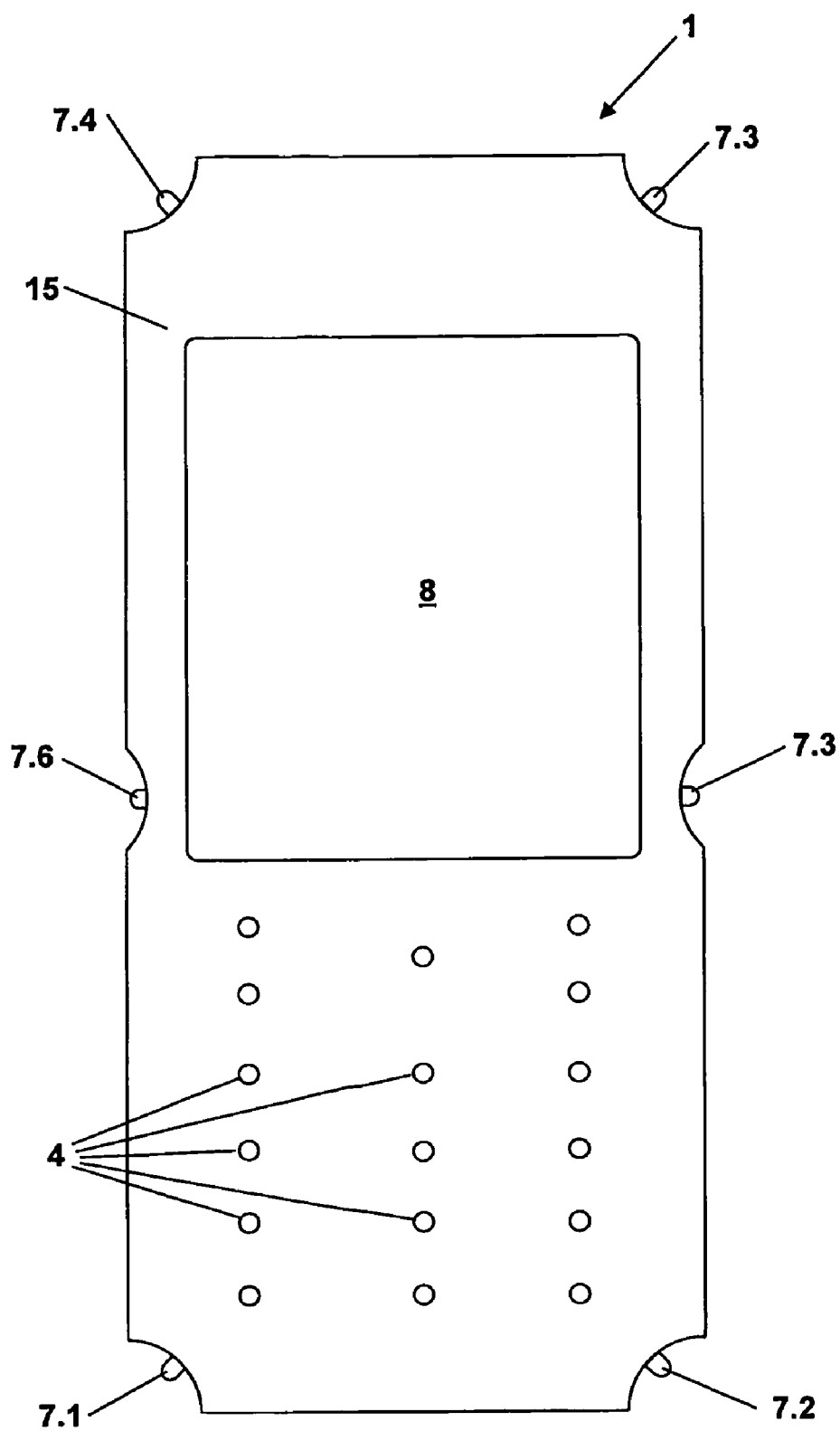
FIG. 2 illustrates the terminal of FIG. 1 with the front cover removed.

The mobile phone 1 is provided with a plurality of lights 7.1 . . . 7.6 arranged under transparent parts in the peripheral area of the front cover 14. The lights 7.1 . . . 7.6 are LEDs that can be activated in three different colors (red, green and yellow) and in a range of 127 different intensities. Different colors can be created by simultaneous activation of two differently colored LEDS, or by LEDs with several internal LEDs (e.g. red, green, blue). Further, the keys 9, 10, 11 and 12 are individually illuminated by backlights 4 formed by LEDs (or could electro-luminescent foils), as shown in FIG. 2 where the releasable attached front cover has been removed and the inner housing 15 of the mobile phone with the lights thereon is visible. The lights 4 can also be activated in three different colors (red, green and yellow) and in 127 different intensities. Up to 3 colors can be lighted in parallel in RGB-LEDs.

The display 3 is an LCD color display with a backlight 8 that can be activated in a range of 127 different intensities. The backlight of display produces only substantially white light.

A flashlight is placed at the top of the phone (not visible) and can be activated in one color and in one intensity (on/off).

Figure 3:
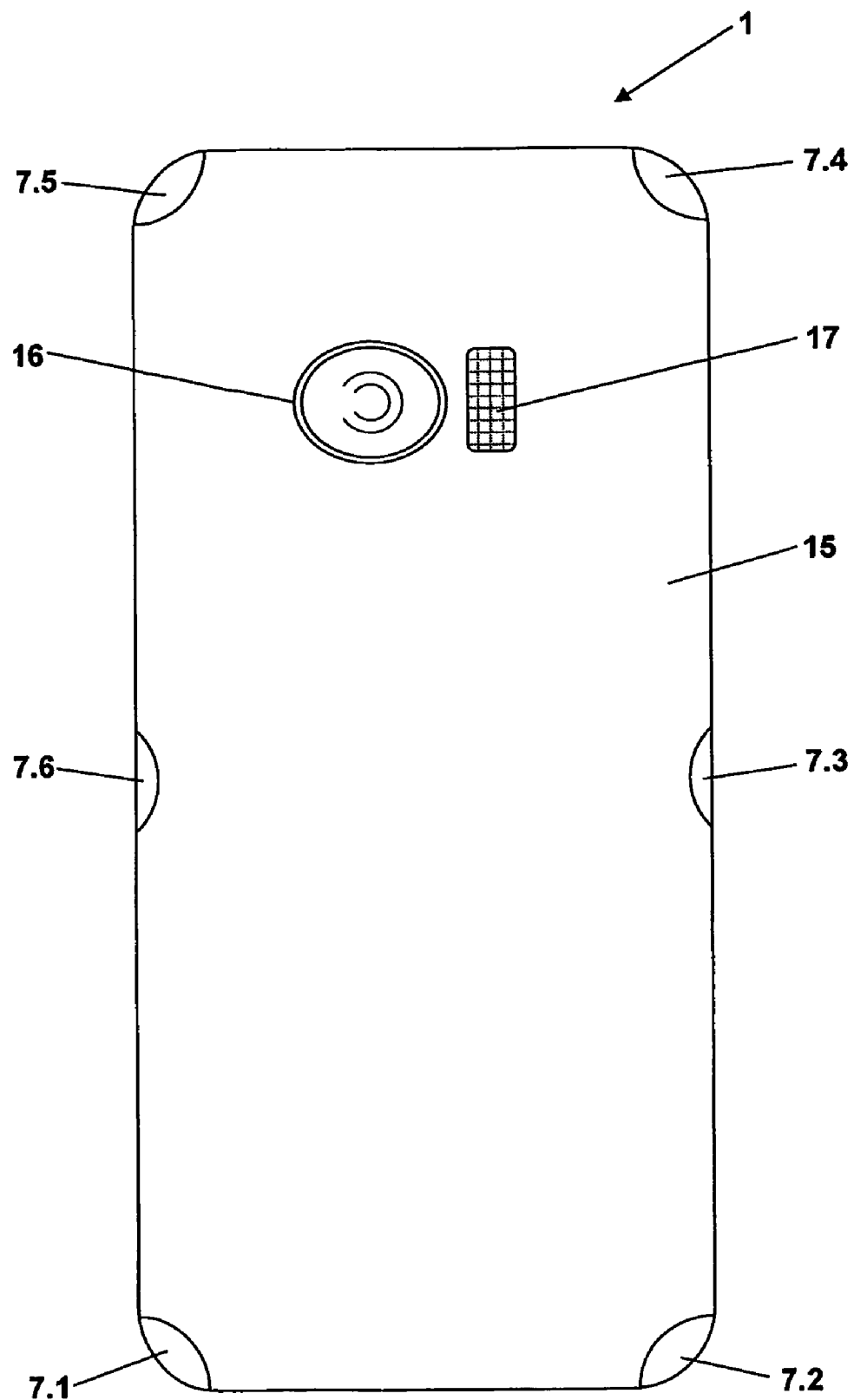
FIG. 3 is a rear view of the terminal of FIG. 1.

FIG. 3 shows the rear of the phone with the releasable attached rear cover 15. Rear cover 15 is provided with transparent parts for the lights 7.1 . . . 7.6 that can be seen from the front, sides and rear of the phone. The rear cover 15 is provided with an opening for a lens 16 of a digital camera and an opening for a camera flash 17. The camera 16 is a digital camera provided with a flash. The camera 16 itself is not of relevance for the present invention and therefore not described in further detail.

Figure 4:
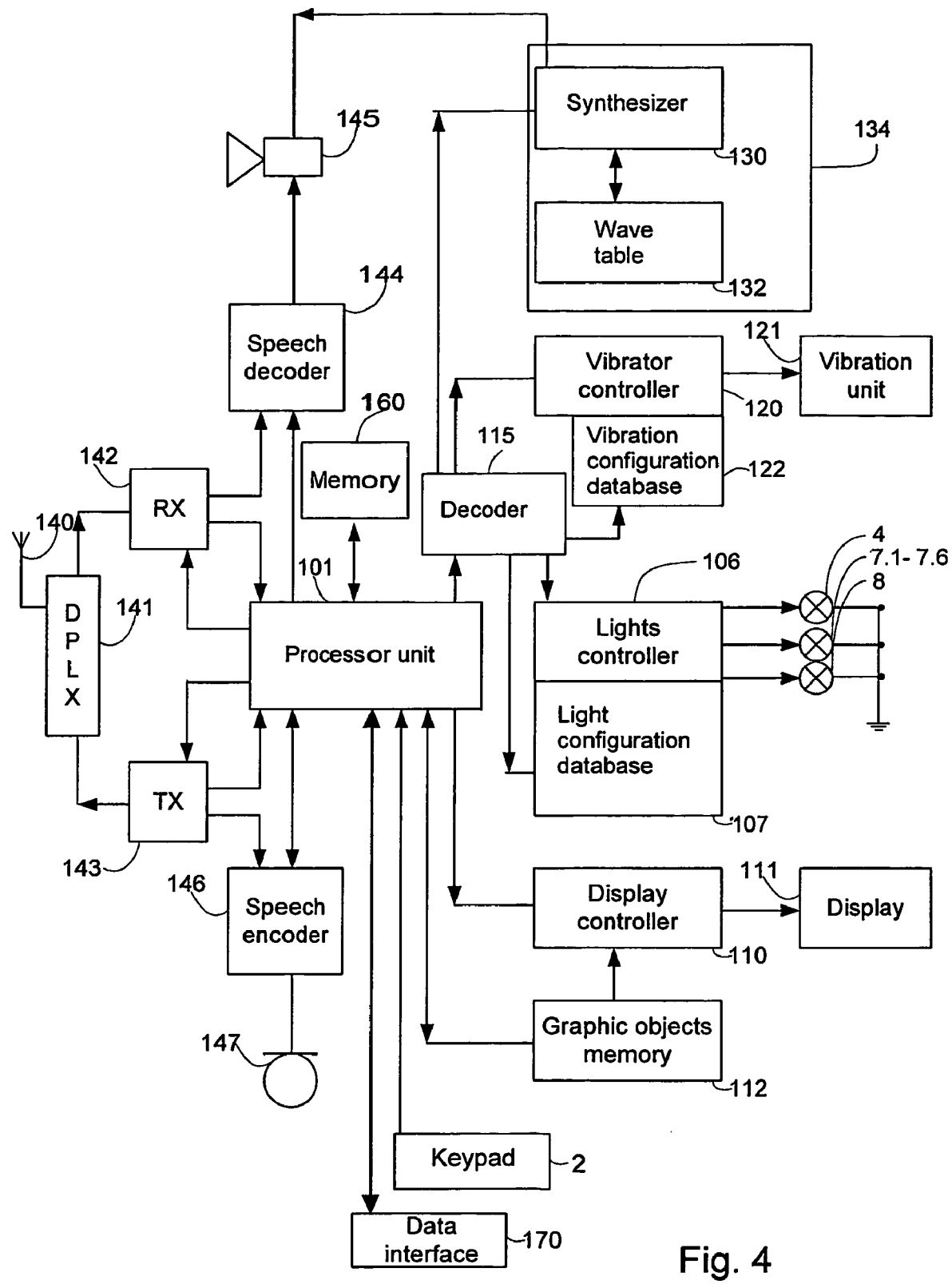
FIG. 4 is a block diagram illustrating the general architecture of a mobile phone in accordance with the present invention.

FIG. 4 schematically shows the most important components of a preferred embodiment of the mobile phone 1, said components being relevant to the understanding of the invention.

The mobile station includes a processor unit 101, which is responsible for the operation of the whole mobile station. The processor unit 101 comprises a microprocessor by means of which functions are controlled and monitored. The mobile station further includes a memory 160, keypad 2 and a data interface 170 dependent on the particular device and application.

Messages to be sent from the mobile station are composed in the processor unit 101 from which they are directed to a transmitter part TX 143 and thence via a duplexer 141, which may be a filter or switch, to an internal antenna 140 to be transmitted further. Sounds received by a microphone 147 can be directed via a speech encoder 146 to the processor unit 101. Messages received by the antenna 140 are directed via the duplexer 141 to a receiver part 142 from which place the message is taken further depending on its type. Received messages may be directed either via the control unit 101 to a message-processing unit or direct to a speech decoder 144 and then to a loudspeaker 145.

A decoder 115 decodes music data and passes the relevant information on to a lights controller 102 and light configuration database 106, a vibrator controller 120, a vibration configuration database 122 and to a MIDI player 134.

The lights controller 102 activates the lights 4,7.1-7.6, and 8; in FIG. 4 three lights have been schematically illustrated, but in reality the light controller controls all the lights described before with reference to FIGS. 1 to 3 independently.

The MIDI player 134 comprises a synthesizer 130 and a wavetable 132 containing sound samples, e.g. digitized samples of musical instruments. The synthesizer fetches sound samples from the wavetable in accordance with messages received from the decoder 110 and converts the digital sound samples to analogue audio signals. The sound of existing instruments is sampled and stored inside the wavetable. The wavetable is a collection of these small samples. By repeatedly playing samples from this table in a loop the original sound is imitated. The synthesizer 130 sends analogue audio signals to be reproduced via an amplifier (not shown) to the loudspeaker 145.

Data is input to the display control unit 110 from the processor unit 101 or graphic objects memory 112. The display controller 110 directs the data further to the display 111 where it is presented to the user. The control unit 101 also has a direct connection with the graphic objects memory 112, which means the control unit can process the graphic objects in memory e.g. by modifying, deleting or adding them.

Ringing tones, and other music data files are stored in the memory 160. The music data can be OMI, or downloaded via GPRS or WAP. The music data for the ringing tones is stored in files in MIDI format. The MIDI format used on the mobile phone is Scalable Polyphony MIDI (SP-MIDI). SP-MIDI content is supported in Standard MIDI File (SMF) format according to the SP-MIDI specification: "Scalable Polyphony MIDI Specification. Version 1.0, RP-034, February 2002, The MIDI Manufacturers Association, Los Angeles, Calif., USA" and the profile specification W Scalable Polyphony MIDI Device 5-24 Note Profile for 3GPP. December 2001, R-035, The MIDI Manufacturers Association, Los Angeles, Calif., USA" (at polyphony level 4).

The music data is organized into MIDI messages, which contain one MIDI command or event. A MIDI file contains a sequence of MIDI messages of different types along with timing information. First type messages, herein referred to as NOTE events, such as NOTE ON, NOTE OFF, AllNotesOff, ResetAllControllers, and AllSoundOff, are coded with 16 channel identifiers. Note messages can represent any note from C-2 (i.e. five octaves below middle c; designated as MIDI note 0) to g8 (i.e. five octaves above the g above middle c; designated as MIDI note 127) and the note messages contain information which of the instruments is to be played. The NOTE ON and NOTE OFF messages are usually composed of one, two, or three bytes of data arranged and transmitted one after another.

A NOTE ON command comprises three bytes, the first of which is the status byte. This byte tells the synthesizer to play a note and specifies the channel number. The channel number is usually associated with the type of sound to be played, i.e. which instrument of the synthesizer is to be used. The second byte specifies the note to be played and the third byte specifies the velocity value for the note.

The second type messages, System Exclusive messages (SysEX message), are used to send data such a patch parameters, sampler data, or sequencer memory bulk dump. The SysEx messages are not always universal and if they are not universal they are in a format that is appropriate for the type of synthesizer that is to play the music. To avoid conflicts with non-compatible SysEx messages, a specific ID number is granted to manufacturers of MIDI instruments by the MIDI Manufacturers Association (MMA) or the Japanese MIDI Standard Committee (JMSC).

The SP-MIDI files comprise a Maximum Instantaneous Polyphony (MIP) message. The MIP message is used to define the musical arrangement of the SP-MIDI content according to the desired polyphony levels, whereby the MIDI channels are ordered according to channel priority and the polyphony level is defined as a cumulative playback requirement starting from the highest priority channels. The corresponding polyphony levels are also included in the MIP message.

According to a preferred embodiment of the invention the SP-MIDI file includes a sequence of MIDI messages including at least one System Exclusive Message that contains data mapping the activation of the lights to the notes in the first type messages. These System Exclusive messages containing data mapping the activation of the lights will hereafter be referred to as light configuration messages. The MIDI file may further contain a System Exclusive Message that contains data mapping the activation of the vibration unit 121 to the notes in the first type messages. These type of messages will hereafter be referred to as vibration configuration messages.

The mapping of the lights and or the vibration unit may be changed during a song by placing further light/vibration configuration messages at a later stage in the sequence.

Figure 5:
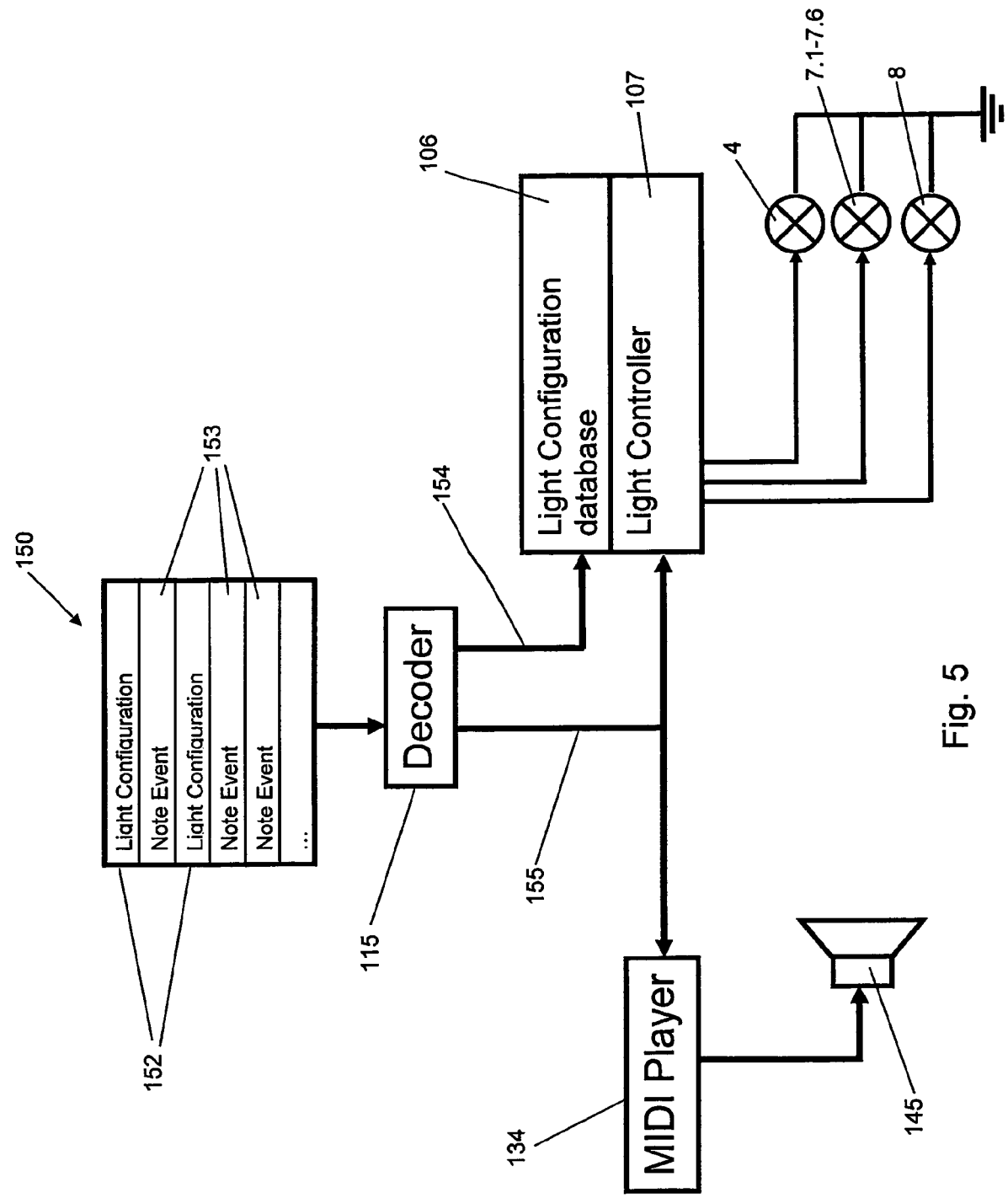
FIG. 5 is a block diagram of the music and light playing parts of the terminal, FIGS. 6.1 to 6.5 illustrate screen shots of a mobile communication terminal that relate to the handling of ringing tones, FIGS. 7.1 to 7.7 illustrate screen shots of a mobile communication terminal that relate to the handling of light configuration messages.

FIG. 5 shows schematically a part of an SP-MIDI sequence 150 according to an embodiment of the invention. The sequence has been retrieved from the memory 160 by the processor unit 101. The processor unit passes the sequence to the decoder. The sequence comprises light configuration messages 152 and note events (NOTE ON or NOTE OFF messages) 153.

The decoder 115 handles the timing and decoding and sends the note events 153 in real time via connection 155 to both the MIDI player 134 and the light controller 107. The decoder 115 sends the light configuration messages 152 via connection 154 to the light configuration database 106. The Light configuration database 106 collects the light configuration messages When the light controller 107 receives a note event, it searches the Light Configuration database for configuration information belonging to this note/channel combination, computes the destination(s), color and intensity information and carries out the corresponding light activation(s) or deactivation(s).

The decoder 115 is also connected to the vibration controller 120 and to the vibration configuration database 122, and the same procedure as described with reference to the light controller 107 takes place in the vibration controller 120.

According to a preferred embodiment of the invention the light configuration messages 152 contain data mapping the location of the lights to be activated to the notes in the note events 153. The light configuration messages according to this embodiment further contain data mapping the color of the lights to be activated to the notes in the note events 153. The intensity or intensity profile of the lights to be activated is mapped to the velocity information in the first type message. The light configuration messages can also include information mapping the simultaneous activation or deactivation of groups of lights to the note information in the note events. These groups of lights are preferably arranged in recognizable patterns such as horizontal or vertical lines, concentric rings etc. The second type messages can contain information that limits the mapping to the note events of a particular channel. The volume setting of the selected channel can be set to zero so that notes played on this channel cannot be heard. This allows the note information in this channel to be exclusively used for light activation, giving a greater flexibility for composers. It is of course also possible to use the notes that are in a channel with a non-zero volume setting, i.e. a channel in which the notes are heard.

The mapping information can take different forms. According to one embodiment a simple look up table is used. In order to use less data, it is though preferred to use a function whose arguments comprise the note number. A first parameter can be added or subtracted from the note number and the result is integer and/or modulo divided by a second parameter in the function. The parameters can be user or factory set. The parameters must be chosen such that it is ensured that the number of available notes (128) corresponds to the number of available light locations and colors respectively.

The number of light locations for the mobile phone described above is six for the peripheral lights 7.1 . . . 7.6.

An example of an appropriate function for location mapping of the lights 7.1 to 7.6 is:

(Note Number−Param1)/Param2%Product Specific Parameter, whereby Param1=36, Param2=12 and the product specific parameter is 6.

The "/" symbol in the function stands for integer division and the "%" symbol in the function stands for modulo divided.

The product specific parameter is factory set and cannot be changed by a composer/user. The parameter 1 and 2 can be varied by a composer to obtain the desired light effects to support the music.

Other examples of appropriate functions for location mapping of the lights 7.1 to 7.6 are:

(Note Number−Param1) %Param2% Product Specific Parameter and

Param1% Product Specific Parameter

It is also possible to assign a random location to any of the note events.

The number of colors for the mobile phone described above is three for the peripheral lights 7.1 . . . 7.6.

An example of an appropriate function for color mapping of the lights 7.1 to 7.6 is:

(Note Number−Param1)/Param2% Number Of Product Colors

Parameter 1 and 2 can be selected by a user/composer, however the selection must be such that the function reduces the number of available notes to the number of available light colors.

Other useful functions for the color mapping are:

(Note Number−Param1) % Param2% Number Of Product Colors,

Param1% Number Of Product Colors,

Rand Common, and

Rand Single.

Within destination patterns which contain more than 1 destination (e.g. All Lights) it is be possible to choose 1 color for all destinations (Rand Common) or each individual destination has a randomly chosen color (Rand Single).

Functions that can be used for intensity mapping are:

Velocity,

Param1,

100% Intensity,

Rand Common, and

Rand Single.

According to a preferred embodiment the flashlight and the camera flash are also controlled by lights controller 102. The camera flash can thus be used to obtain a stroboscope effect.

FIGS. 6.1 to 6.4 show screenshots of the menu on the display 3. FIG. 6.1 shows the display after entering the menu structure from the idle state shown in FIG. 1 by pressing the left softkey 10. The display shows some of the menu items of an endless loop type scrollable list of menu items. One of the menu items, "Gallery", can be selected to arrive at the display of FIG. 6.2.

The display now shows some of the "Gallery" submenu items in an endless loop type scrollable list. Via the submenu item "View folders" the display of FIG. 6.3 can be reached. Here, the user can select between different folders. By selecting the "Tones" folder and pressing the left softkey 10 the names of the music data files stored in the "Tones" folder are listed in a scrollable list as shown in FIG. 6.4. A particular music data file can be selected using the navigation key 11 and the left softkey 10 "Options" and the display changes to the screenshot of FIG. 6.5. listing the options for handling the selected music data (SP-MIDI) file. The options include opening the file (i.e. playing the file), deleting, moving or renaming the file and editing the light effects. By selecting the "Light effects" menu item an application for creating, editing and or deleting light activations associated with the playing of notes in the selected MIDI file is started.

The opening screen of the light effect editor is shown in FIG. 7.1. The light effect editor displays a scrollable list of selectable menu items comprising: "Source", "Destination", "Mode", "Designation mapping", "Color mapping", "Intensity mapping" and "Save".

When the user selects the menu item "Source", the display changes to the state of FIG. 7.2 and the available channels are listed as selectable menu items. The user can now select the desired channel to use as the source of the NOTE ON and NOTE OFF events that will be used to activate the lights.

When the user selects "Destination" in the state of FIG. 7.1, the display changes to the state of FIG. 7.3 and the available light groups are listed as selectable menu items. The user can now select the light group to be used, e.g. "Front", "Camera flash", "Flashlight" or "Backlight".

When the user selects "Mode" in the state of FIG. 7.1, the display changes to the state of FIG. 7.4 and the available modes are listed as selectable menu items. The modes relate to the selection of activation of single lights or activation in groups of lights in recognizable patterns. The user can now select the desired mode of activation, e.g. "Location" for the activation of single lights in particular positions, "Horizontal" for the activation of groups of lights arranged along a horizontal line, "Vertical" for the activation of groups of lights arranged along a vertical line, and "Concentric rings" for the activation of groups of lights arranged in concentric rings.

When the user selects "Destination mapping" in the state of FIG. 7.1, the display changes to the state of FIG. 7.5 and the available location/mapping functions are listed as selectable menu items. The list includes different functions, some use the note number as an argument others simply activate the lights at all locations or activate a light at a random position. By selecting functions including user changeable parameters, a new screen appears (not shown) allowing the user to change the available parameters (P1,P2). Since the function has to reduce the note range in the song to the number of available light positions a routine prevents the user from selecting values for the parameter that would not fulfill this criterion.

When the user selects "Color mapping" in the state of FIG. 7.1, the display changes to the state of FIG. 7.6 and the available color mapping functions are listed as selectable menu items. The list includes different functions, some use the note number as an argument others simply activate the lights in all colors activate a light in a random color. By selecting functions including user changeable parameters, a new screen appears (not shown) allowing the user to change the available parameters (P1,P2). Since the function has to reduce the note range in the song to the number of available colors a routine prevents the user from selecting values for the parameters P1,P2 that would not fulfill this criterion.

When the user selects "Intensity mapping" in the state of FIG. 7.1, the display changes to the state of FIG. 7.7 and the available intensity mapping functions are listed as selectable menu items. The list includes different functions, one uses the velocity associated with the note as an argument others simply activate the light in accordance with a preselected intensity form a range of 128 evenly distributed incremental values. Also random functions can be selected.

The state of FIG. 7.1 can be reached by pressing the right softkey "Back" in the state of the screens 7.2 to 7.7

When the user has finished to create/edit the light configuration the "Save" menu option in the state of FIG. 7.1 can be used to save the new mapping and the Light configuration application is closed by pressing the right softkey 10 "Exit". The screen changes to the state of FIG. 6.5 and the selected song can now be played with the new light configuration by selecting the menu item "Open".

The mobile phone 1 may in a further embodiment also be provided with an editor application that enables the user to create and edit and/or delete all types of MIDI messages and the timing information (not shown).

FIG. 8 shows a screen shot of a PC or similar computer terminal with a MIDI editor running thereon. The MIDI editor allows users to compose, record and playback MIDI files. The MIDI playback function is a software program that turns the computer into a sequencer. With a sound card installed inside of the computer, the sequencer can playback musical performances without even needing external MIDI sound modules (since most sound cards now have an internal, multitimbral General MIDI module, usually a wavetable synth, that can recognize and properly "play" the MIDI messages that the sequencer outputs to the sound card's driver).

The MIDI editor displays a window 202 with a number of fields with items for use in editing and creating MIDI files. Field 208 shows an overview of the tracks and the name, instrument, device, channel and volume associated therewith. Field 210 shows the notes played for each track. Field 212 comprises a set of buttons for activating a play, record, pause stop fast forward and fast rewind functions. All these aspects are conventional and well known in that art and therefore not described in further detail.

A plug-in program for a conventional MIDI editor displays a second window 220 that emulates light activations on a mobile. This plug-in comprises a software simulated decoder, light controller and light configuration database described above. When a MIDI file containing light configuration messages is played by the MIDI editor, the plug-in program activates the lights on the emulated mobile phone in window 220. Thus, the MIDI file with the light effect can be tested without needing to first download the MIDI file to the mobile phone 1. The mobile phone emulation program does not need to be a plug-in to a conventional MIDI editor program, it could also be an integrated part of a MIDI editor or the like, also referred to as virtual music studios.

Window 202 also comprises a button 214 for opening a light configuration messages editor application.

Figure 9:
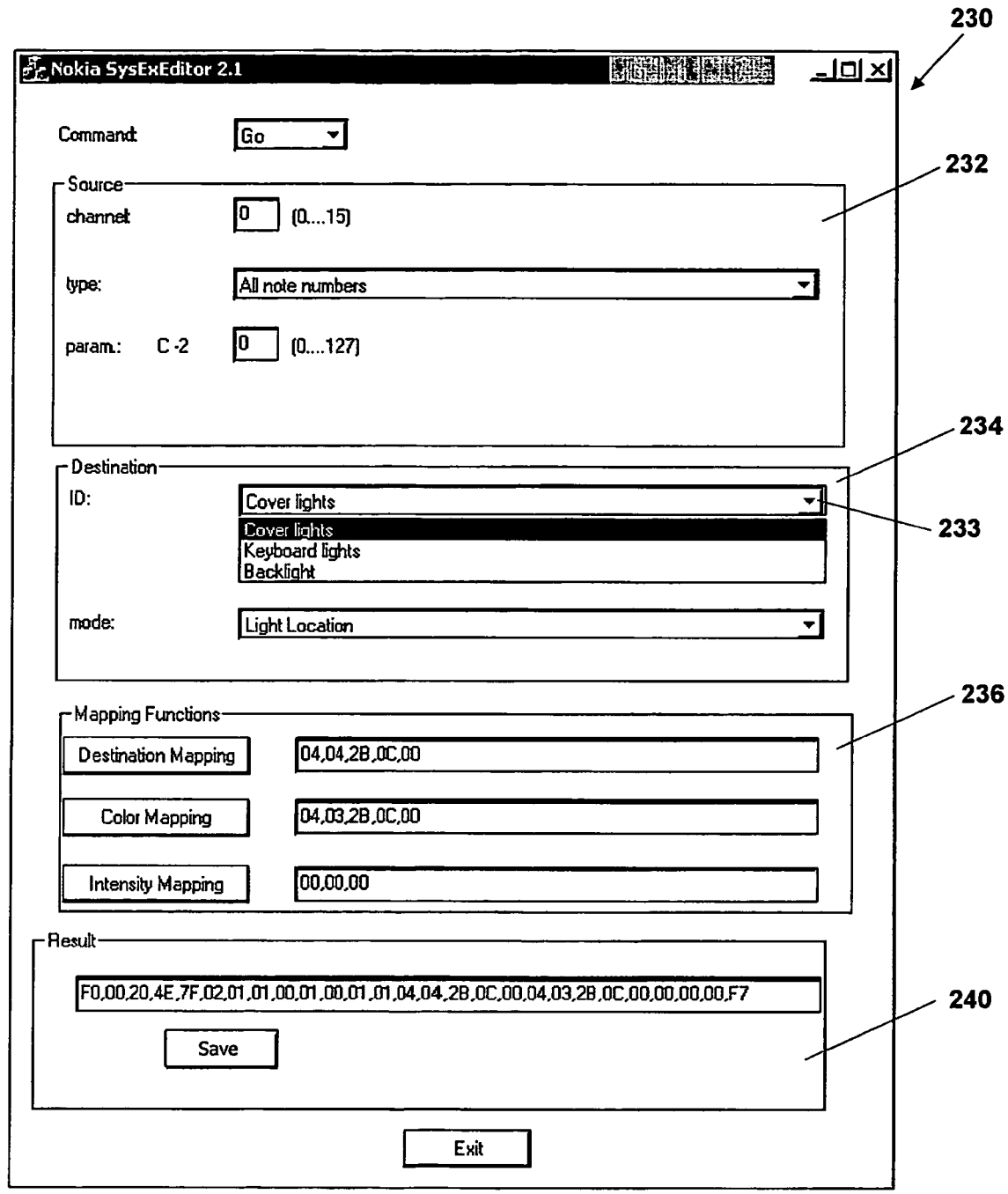

FIG. 9 shows a window 230 displayed by the light configuration messages editor application on the screen of the PC. The window comprises a "Source" field 232, a "Destination" field 234, a "Mapping functions" field 236 and a "Result" field 240. The "Source" field 232 includes a channel selection box allowing the user to enter the channel number numerically and a note type selection pull down menu allowing the user to select between all notes numbers or single note numbers. In case the type 'Single note number' has been selected, the exact note number has to be numerically entered in the param field.

The "Destination" field 234 comprises a destination pull down menu 233 allowing the user to select the group of lights that are to be activated, e.g. cover lights 7.1 ... 7.6, keyboard lights 4, camera flash 17 or backlight 8.

Figure 10:
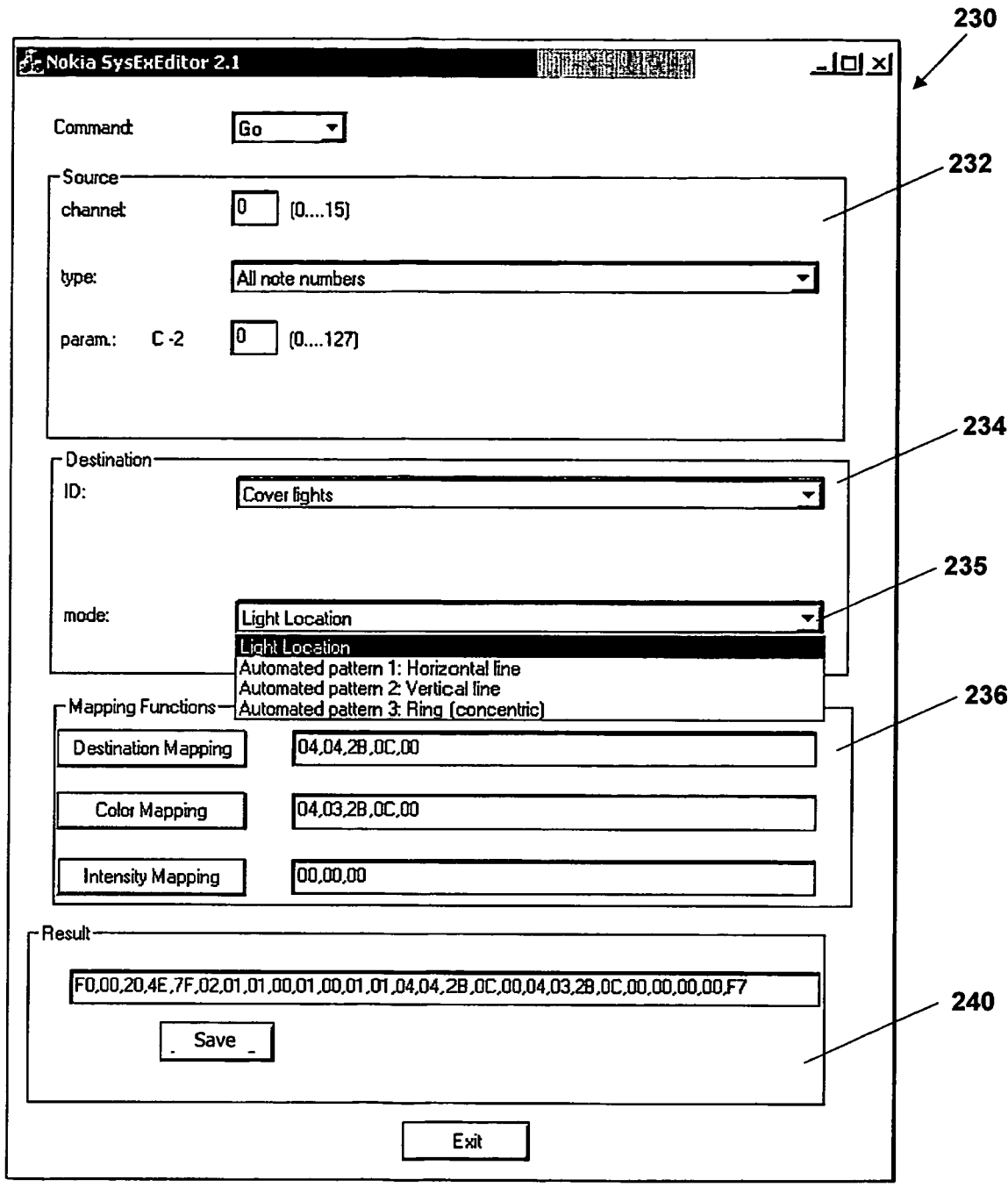
FIGS. 10 to 14 are screen shots of a light configuration message editor.

The "Destination" field also comprises a pull down menu 235 (FIG. 10) allowing the user to select the mapping mode form e.g. the following options: light location, Automated pattern 1: Horizontal line, Automated pattern 2: Vertical line, Automated pattern 3: Ring (concentric). When "Location" is selected the mapping is towards single positions. When patterns are selected a whole group of lights in the shape of the selected pattern are activated simultaneously.

Figure 11:
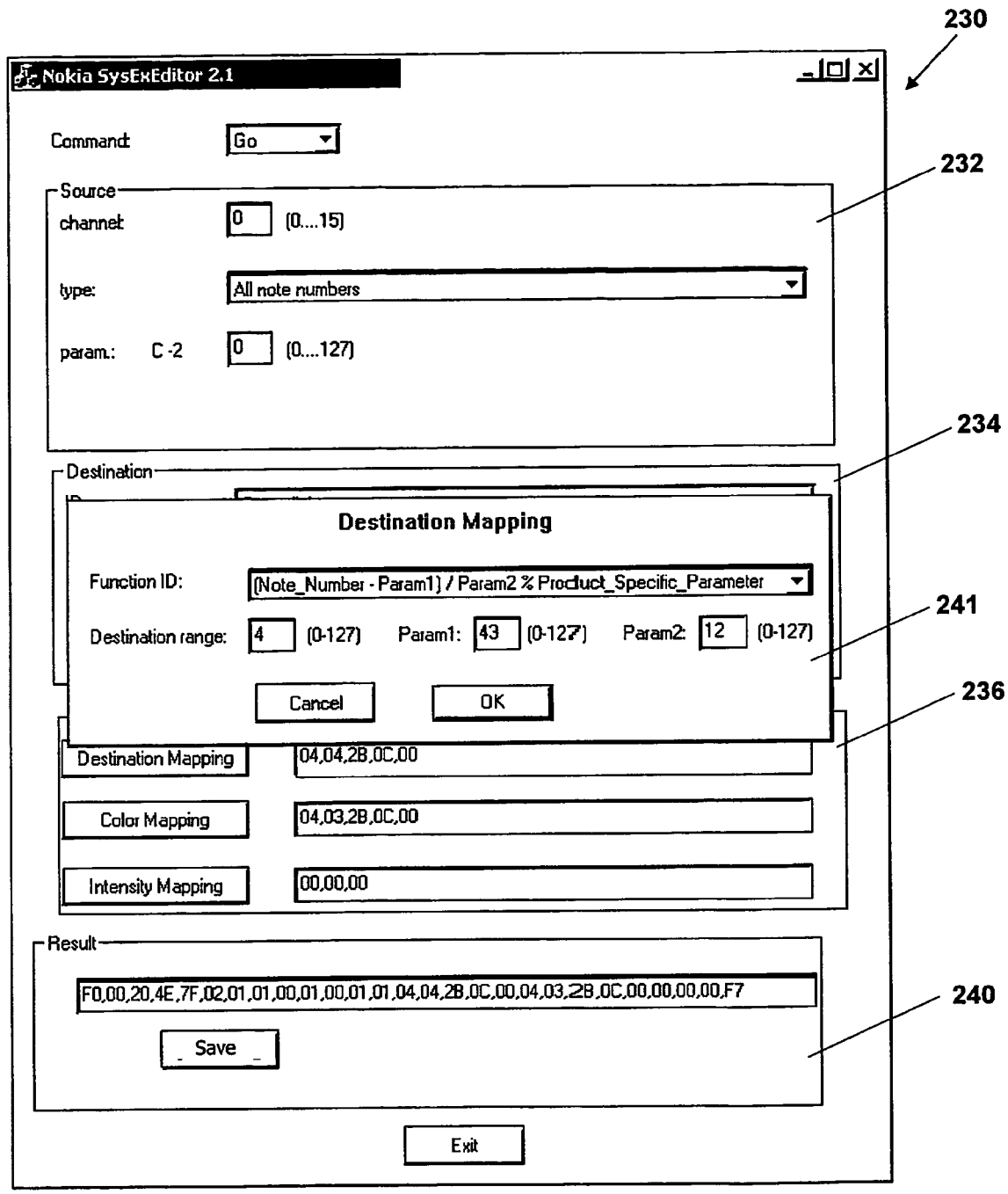
Figure 12:
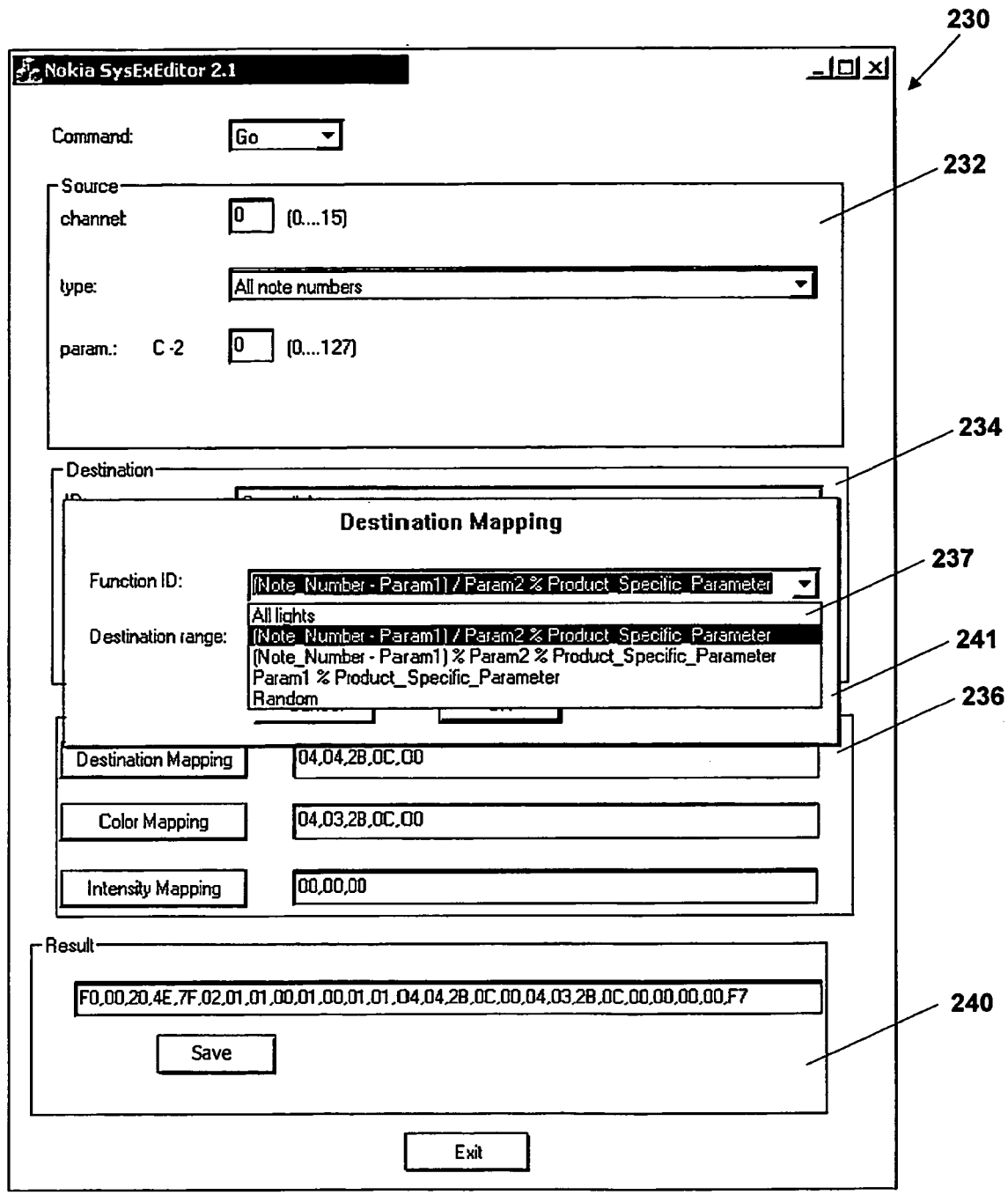
Figure 13:
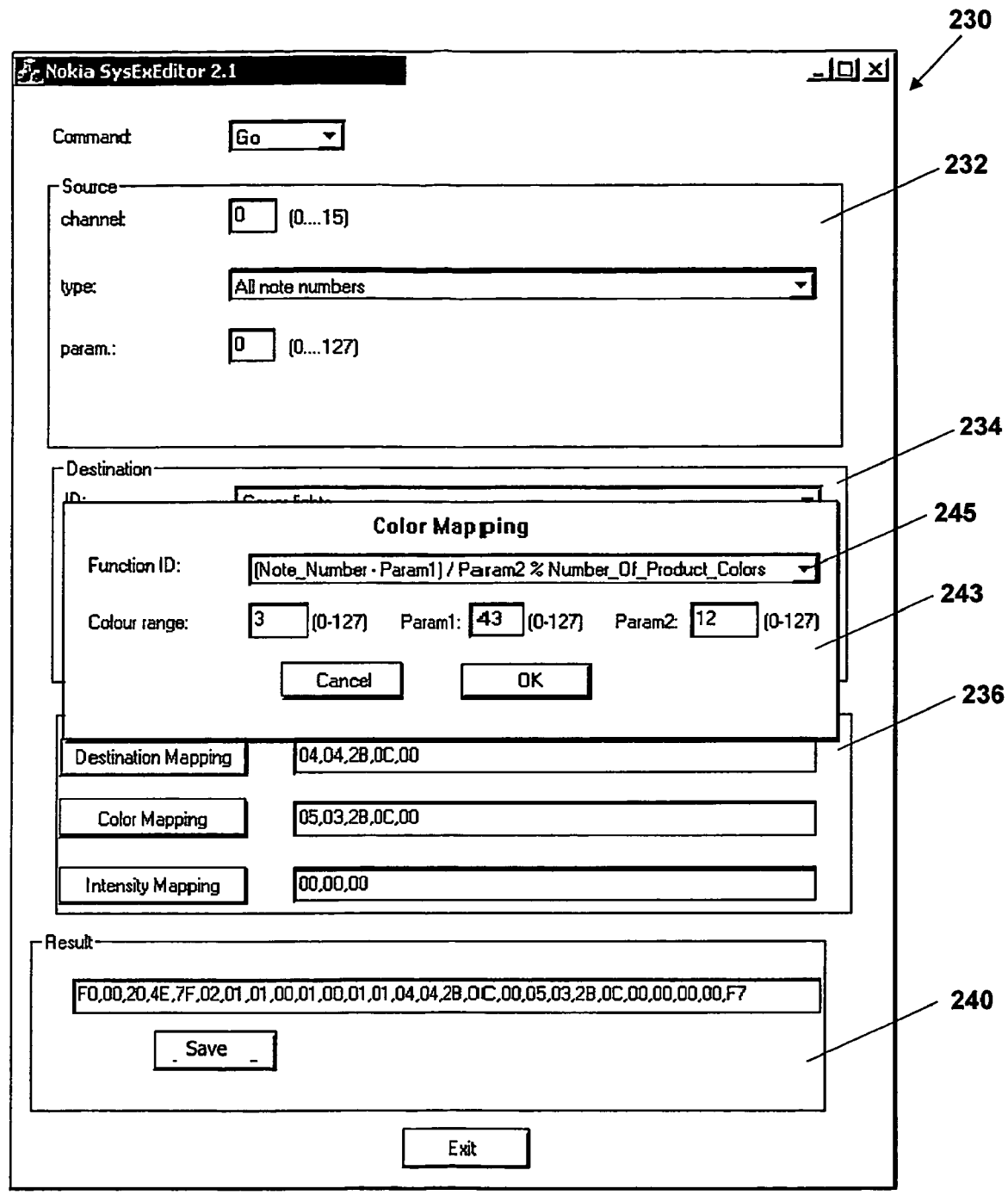

The "Mapping functions" field 236 includes a "Destination Mapping" button that activates a pop up window 241 (FIG. 11). Pop-up window 241 includes three boxes for numerically entering the destination range, parameter 1 and parameter 2 of the mapping function. The mapping function is selected in a pull down menu 237 (FIG. 12). The mapping functions field 236 includes a "Color Mapping" button that activates a pop up window 243 (FIG. 13). Pop-up window 243 includes three boxes for numerically entering the color range, parameter 1 and parameter 2 of the mapping function. The mapping function is selected in a pull down menu (not shown) with button 245).

The mapping functions field 236 includes also a "Intensity Mapping" button that activates a pop up window (not shown) allowing the selection of the functions and parameters for the intensity mapping described above.

Figure 14:
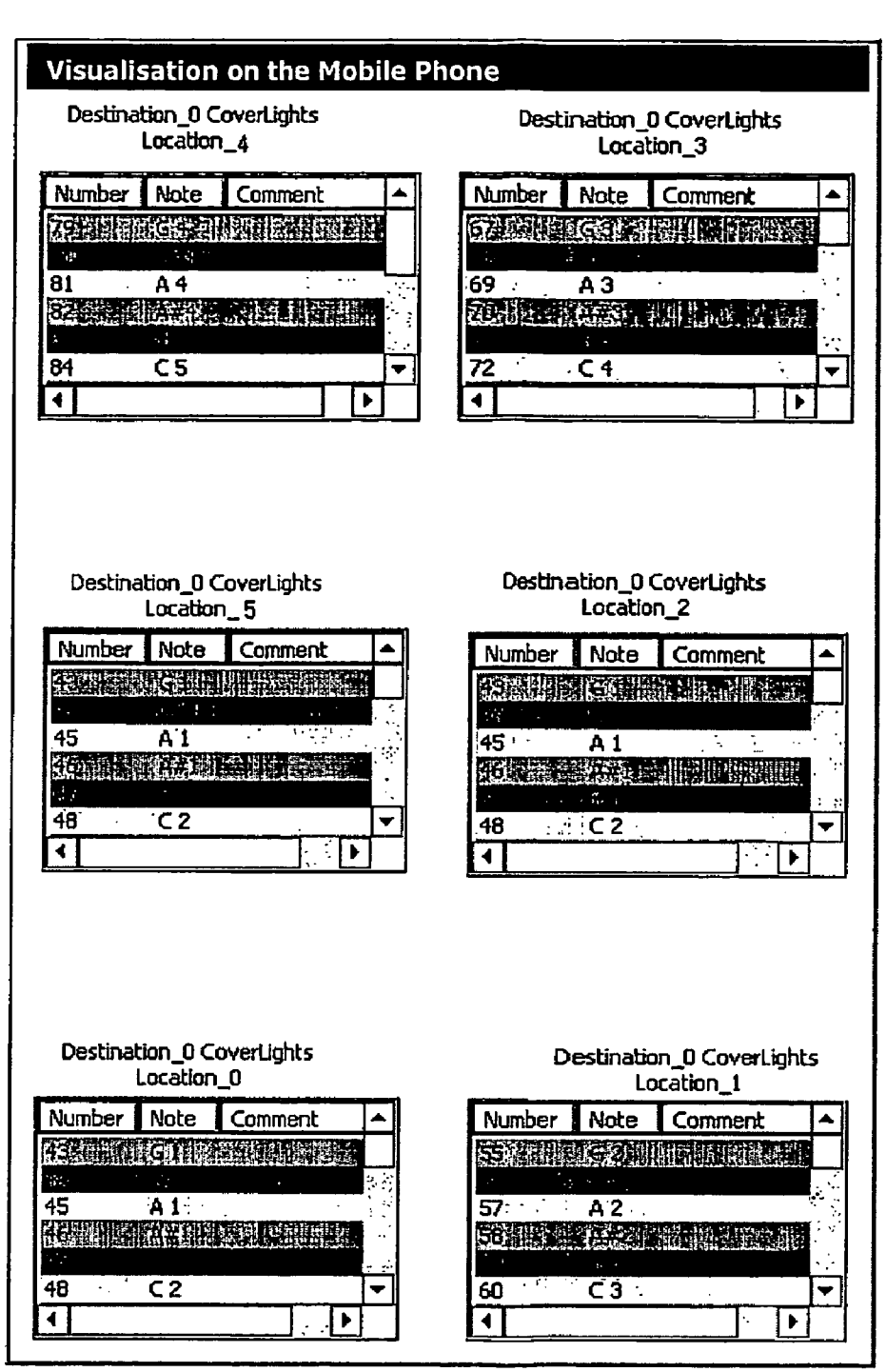

The light configuration messages editor application also displays a window 250 "Visualization on the Mobile Phone" on the screen of the computer terminal (FIG. 14). The visualization window 250 includes six fields (as many as there are light positions), and each field contains a scrollable list of items, one item for each MIDI note number (with the musical notation displayed there besides). Each item is displayed in the color to which the note concerned is mapped. In FIG. 14 the three colors red, green and yellow are represented by three different grey scale levels. The visualization window thus shows the light position and color to which a note is mapped and assists the composer in finding the desired settings for the light configuration message.

The "Result" field displays the content of light configuration message and includes a "Save" button for saving the light configuration message to the respective MIDI file and an "Exit" button to leave the light configuration editor program.

Figure 15:
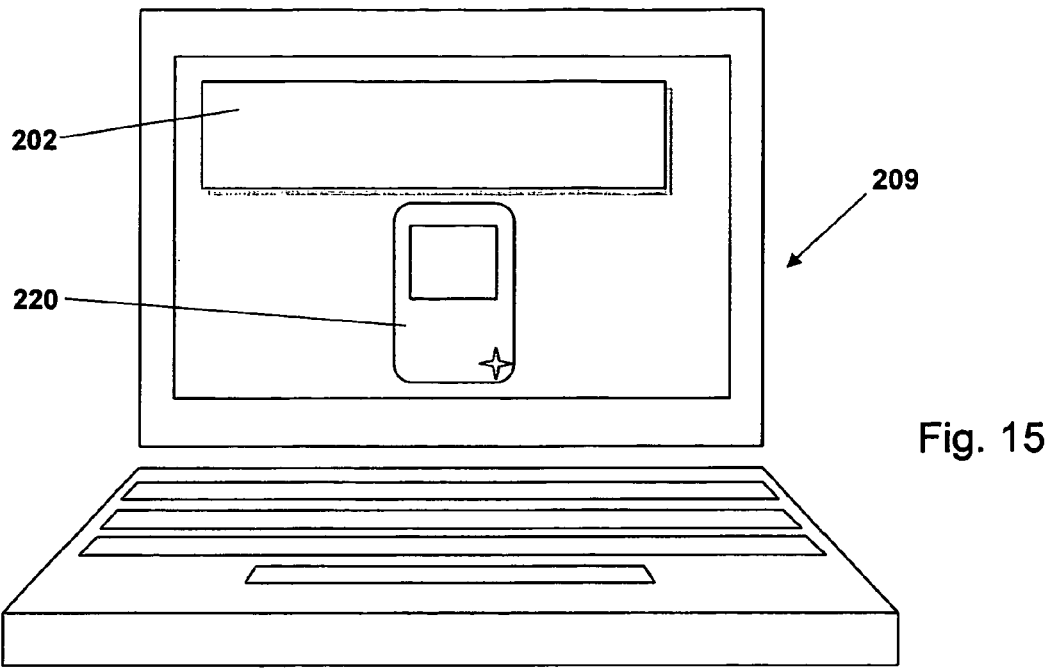
FIG. 15 illustrates a computer terminal for use with the present invention, and FIG. 16. illustrates a mobile communication terminal that is connected to the computer terminal of FIG. 15.

FIG. 15 shows a PC in the form of a laptop with the MIDI editor window 202 and the mobile phone emulation window 220 displayed on the screen.

Figure 16:
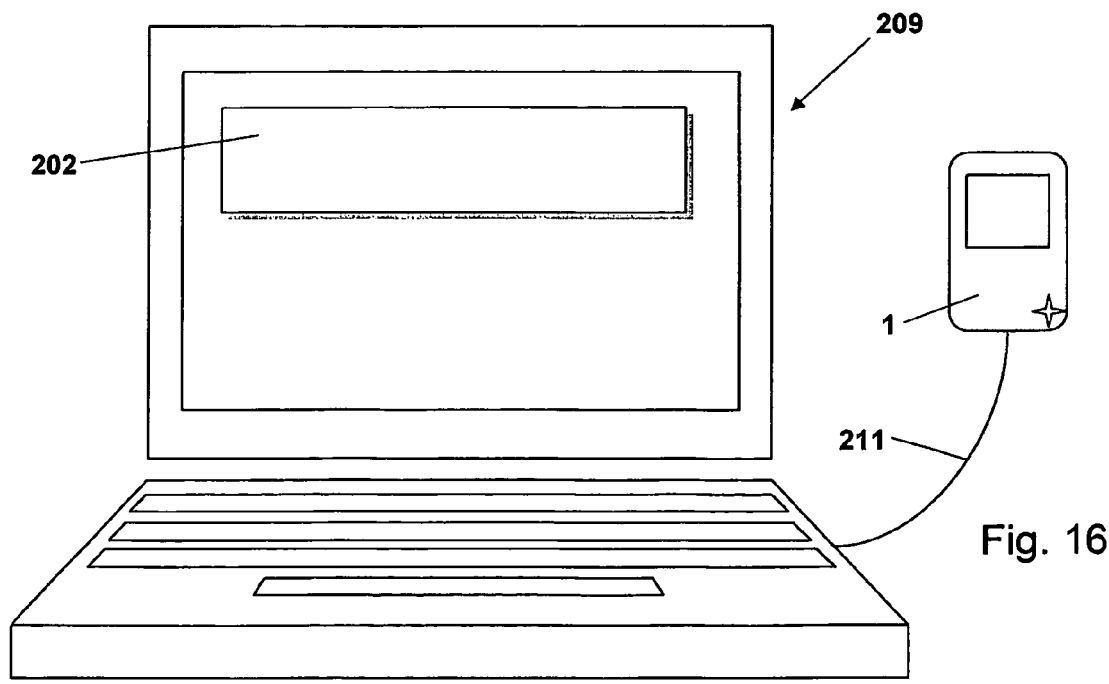

FIG. 16 shows a PC in the form of a laptop 209 with the MIDI editor window 202 displayed on the screen. A mobile phone 1 is connected to the PC via the respective serial busses and a serial data cable 211. The MIDI editor program or the plug in program and the mobile phone 1 are configured such that the lights of the mobile phone 1 are activated when a MIDI file containing light configuration is played on the MIDI editor on the laptop 209. The complete MIDI sequence is sent via the serial cable to the processor unit 101 that passes the MIDI sequence to the decoder 115, then the procedure of playing the song and activating the lights and the vibration unit is as described above for the playing of MIDI files stored in the memory 160.

Although the present invention has been described in detail for purpose of illustration, it is understood that such detail is solely for that purpose, and variations can be made therein by those skilled in the art without departing from the scope of the invention.

The present invention has been described with reference to the MIDI format, however other data formats may be used provided that they convey the same types of data information for the control and operation of sound generators and receivers. Examples of such format are OpenSound Control (OSC), ZIPI, GS (Roland MIDI Format) and XMF (extensible Music Format).

Thus, while the preferred embodiments of the devices and methods have been described with reference to the environment in which they were developed, they are merely illustrative of the principles of the inventions. Other embodiments and configurations may be devised without departing from the scope of the appended claims.

The invention claimed is:

1. A mobile communication terminal comprising:
   a processor unit being configured to control said communication terminal,
   an electronic memory having at least one music data sequence received therein, wherein a single music data sequence is configured to control both a playing of notes a particular instrument and an activation of lights, the single music data sequence comprises note events and light configuration messages, the note events containing information for notes to be played, and the light configuration messages mapping locations of lights to be activated to the notes in the note events and containing other music related information for the mobile communication terminal,
   a loudspeaker connected to a sound generator configured for generating audio waveforms in accordance with the information in the note events,
   a plurality of lights that can be activated by the processor unit, and
   the processor unit being configured to receive both the note events and the light configuration messages in the single music data sequence, the processor being configured by the information in light configuration messages to activate the lights based on the information contained in the note events of the single music data sequence, wherein the light configuration messages contain data mapping a simultaneous activation of the lights to the note information in the note events note events and the mapping reduces the number of available notes to the number of available light locations.

2. A mobile communication terminal according to claim 1, wherein the note events comprise note-on events and note-off events, and said processor unit is configured to use a last event in the note events when one light or one light group is mapped to one or more notes at the same time.

3. A mobile communication terminal according to claim 1, in which the lights are distributed over a plurality of different locations of the terminal, and the light configuration messages contain data mapping the location of the lights to be simultaneously activated to the notes in the note events, and the processor unit being configured to activate lights at locations in accordance with the information in the light configuration messages.

4. A mobile communication terminal according to claim 1, comprising lights in a plurality of different colors, the light configuration messages containing data mapping the color of the lights to be activated to the notes in the note events message and the processor unit being configured to activate lights with the color in accordance with the data in the light configuration messages.

5. A mobile communication terminal according to claim 1, wherein the light configuration messages contain data mapping the intensity or intensity profile of the lights to be activated to the information in the note events message, and the processor unit being configured to activate lights with the intensity in accordance with the mapping data in the light configuration messages.

6. A mobile communication terminal according to claim 5, wherein the note events messages contains the velocity of the notes, and the intensity of the light to be activated is mapped to the velocity of the notes concerned.

7. A mobile communication terminal according to claim 1, wherein the light configuration messages contain data mapping the location of the lights to be activated to the notes in the note events message, and the processor unit being configured to activate lights at locations in accordance with the information in the light configuration messages.

8. A mobile communication terminal according to claim 1, wherein the light configuration message contains data mapping the activation of groups of lights to be activated simultaneously to the note information in the note events messages, and the processor unit being configured to activate the groups of lights in accordance with the data in the light configuration messages.

9. A mobile communication terminal according to claim 8, wherein a group of lights to be activated comprises a plurality of lights arranged in a recognizable pattern.

10. A mobile communication terminal according to claim 1, wherein said music data is arranged in a number of channels and the note events messages are assigned to one of the channels, and note events messages used for activating the lights are assigned to a specific one of the channels.

11. A mobile communication terminal according to claim 10, wherein the volume setting for the channel used for activating the lights is set to zero to create a dedicated light activation channel.

12. A mobile communication terminal according to claim 1, wherein the mapping comprises a function whose arguments comprise the note number.

13. A mobile communication terminal according to claim 12, wherein a first parameter is added or subtracted from the note number and the result is integer or modulo divided by a second parameter in the function.

14. A mobile communication terminal according to claim 12, wherein the function reduces the number of available notes to the number of available light colors.

15. A mobile communication terminal according to claim 12, wherein the mapping comprises a random function.

16. A mobile communication terminal according to claim 1, wherein the mapping comprises a look up table.

17. A mobile communication terminal according to claim 16, wherein the terminal comprises a vibrator, a flashlight or a camera flash and the processor being configured by light configuration message to activate the vibrator flashlight or camera flash based on the information contained in the note events messages.

18. A mobile communication terminal according to claim 1, further comprising an editor application enabling a user to create or edit the light configuration messages.

19. A mobile communication terminal according claim 18, wherein the editor application enables the user to select the channel to be used, to select the patterns to be activated, or to modify the function.

20. A mobile communication terminal according claim 18, wherein the terminal comprises different ranges of lights, and the editor application enables the user to select the range.

21. A mobile communication terminal according claim 18, wherein the editor application enables the user to map the intensity to the velocity, to a given fixed parameter, or to a random number.

22. A mobile terminal according to claim 18, wherein the editor application enables the user to edit the music data contained in the note events messages to add, delete or change notes and note related information.

23. A mobile terminal according to claim 1, wherein the single music data sequence is a MIDI sequence or file that does not include an instrument definition associated with a light grouping.

24. A mobile terminal according to claim 23, wherein the light configuration messages are System Exclusive Message and the note events messages are channel voice messages, NOTE ON and NOTE OFF messages.

25. A method for controlling the activation of lights of a mobile communication terminal configured to play music from music data, wherein a single music data sequence is configured to control both a playing of music and an activation of lights, wherein the single music data sequence comprises at least a note events message and a light configuration message, the note events message containing information for notes to be played and the light configuration message mapping locations of lights to be activated to the notes in the note events message and containing other information for the device that is to reproduce the music, and activating the lights based on the information contained in the note events of the music data and wherein the light configuration messages contain data mapping a simultaneous activation of the lights to the note information in the note events message and the mapping reduces the number of available notes to the number of available light locations.

26. A method according to claim 25, wherein data mapping the position of lights to be activated is placed in the light configuration messages.

27. A method according to claim 25, wherein data mapping the color of lights to be activated is placed in the light configuration messages.

28. A method according to claim 25, wherein data mapping the intensity of lights to be activated is placed in the light configuration messages.

29. A method according to claim 25, wherein data mapping the simultaneous activation of groups of lights arranged in recognizable patterns to be activated, is placed in the light configuration messages.

30. A method according to claim 25, wherein a function whose arguments include the note number is placed in the light configuration messages.

31. A method according to claim 30, further comprising adding or subtracting a first parameter from the note number and integer or modulo dividing the result by a second parameter.

32. A method according to claim 30, wherein the function reduces the number of available notes to the number of available light colors.

33. A method according to claim 30, further comprising the step of applying a random function in the mapping.

34. A method according to claim 25, further comprising the step of using a look up table for the mapping.

35. A method according to claim 25, wherein the music data is a MIDI sequence or file.

36. A method according to claim 35, wherein the light configuration messages are System Exclusive Messages.

37. A method according to claim 25, wherein one of more light configuration messages are placed in the beginning of the music data file or sequence for initializing the mapping.

38. A method according to claim 37, in which further light configuration messages are placed later in the music data file or sequence for changing the mapping, the light configuration messages all being located within one track.

39. A computer terminal comprising:
a processor unit controlling the terminal,
a user interface comprising a keyboard and a display,
an electronic memory having music data stored thereon, wherein a single music data sequence is configured to control both a playing of notes a particular instrument and an activation of lights, the single music data sequence comprising at least a note events message and a light configuration message, the note events messages containing information for notes to be played, the light configuration messages mapping locations of lights to be activated on a mobile communication terminal to the note information in the note events messages, and wherein the light configuration messages contain data mapping the activation of the lights to the notes in the note events message, the light configuration messages contain data mapping a simultaneous activation of the lights to the note information in the note events message and the mapping reduces the number of available notes to the number of available light locations,
a loudspeaker connected via an amplifier to a sound generator capable of generating audio waveforms in accordance with the music data, and
an application for creating and/or modifying the light configuration messages.

40. A computer terminal according to claim 39, wherein the application is configured to emulate the activation of the lights of a mobile terminal on the display of the computer terminal.

41. A computer terminal according to claim 39, wherein the application is configured for controlling lights of a mobile communication terminal connected thereto for allowing the testing of the activation of the lights directly on the mobile communication terminal.

42. A single music data sequence or file for use on a mobile communication terminal, said single music data file comprising:
note events messages with note information, and
light configuration messages mapping a simultaneous activation of lights of a mobile communication terminal to the note information contained in the note events messages, wherein the light configuration messages contain data mapping a location and the activation of the lights to the note information in the note events message and the mapping reduces a number of available notes to a number of available light locations.

43. A music data sequence or file according to claim 42, wherein the note events messages contain information mapping the activation of lights to the note-on commands, and information mapping the deactivation of lights to note-off commands.

44. A music data sequence or file according to claim 42, wherein the note events messages contain velocity information associated with a note-on command, and the light configuration messages contain information mapping the intensity of a light to be activated to the velocity information.

45. A music data sequence or file according to claim 42, wherein the note events messages contain the note number associated with a note-on or note-off command, and the light configuration messages contain a function whose arguments comprise the note number.

46. A music data sequence or file according to claim 45, wherein the function reduces the range of note numbers to the range of light locations on the mobile communication terminal.

47. A music data sequence or file according to claim 46, wherein the function reduces the range of note numbers to the range of light colors on the mobile communication terminal.

48. A music data sequence or file according to claim 42, wherein the single music data or sequence is in a MIDI format that does not include an instrument definition associated with a light grouping.

49. A music data sequence or file according to claim 48, wherein the light configuration messages are system exclusive messages.

50. A music data sequence or file according to claim 42 stored in a computer medium.

51. The mobile communications terminal according to claim 1 wherein the note events are passed to an audio portion of the processor and a light controller, and the light configuration message is passed to a light configuration database, the light controller being configured to search the light configuration database for configuration information corresponding to the note events when the note events are detected.

* * * * *

UNITED STATES PATENT AND TRADEMARK OFFICE
CERTIFICATE OF CORRECTION

| | | |
|---|---|---|
| PATENT NO. | : 7,767,900 B2 | Page 1 of 1 |
| APPLICATION NO. | : 10/586568 | |
| DATED | : August 3, 2010 | |
| INVENTOR(S) | : Abe et al. | |

It is certified that error appears in the above-identified patent and that said Letters Patent is hereby corrected as shown below:

Title Page item 57

In line 3 of the Abstract, delete "informating" and insert --informing-- therefore.

Column 13, line 38, after note events, delete "note events".

Signed and Sealed this

Ninth Day of November, 2010

David J. Kappos
*Director of the United States Patent and Trademark Office*